M. RAHR, Jr.
VEHICLE QUARTER CURTAIN.
APPLICATION FILED SEPT. 20, 1918.
1,428,708.
Patented Sept. 12, 1922.
2 SHEETS—SHEET 1.
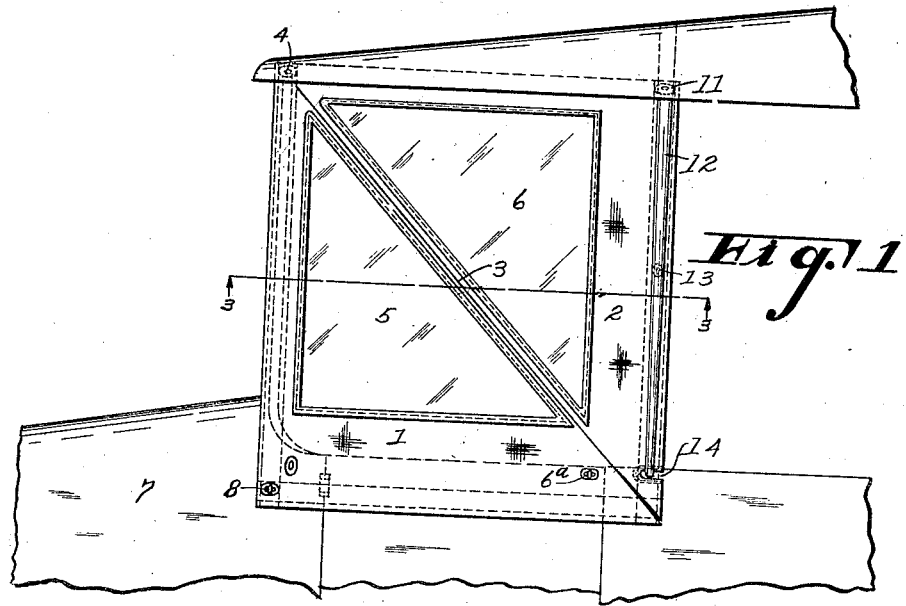
Fig. 1
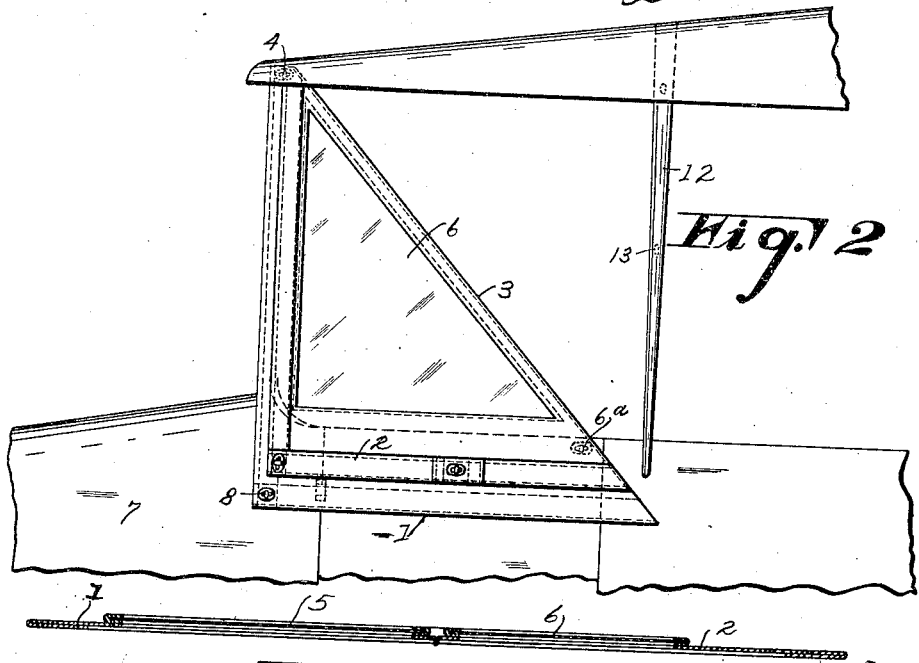
Fig. 2
Fig. 3
Witness
Inventor
Maximilian Rahr Jr.
By Erwin & Wheeler
Attorney

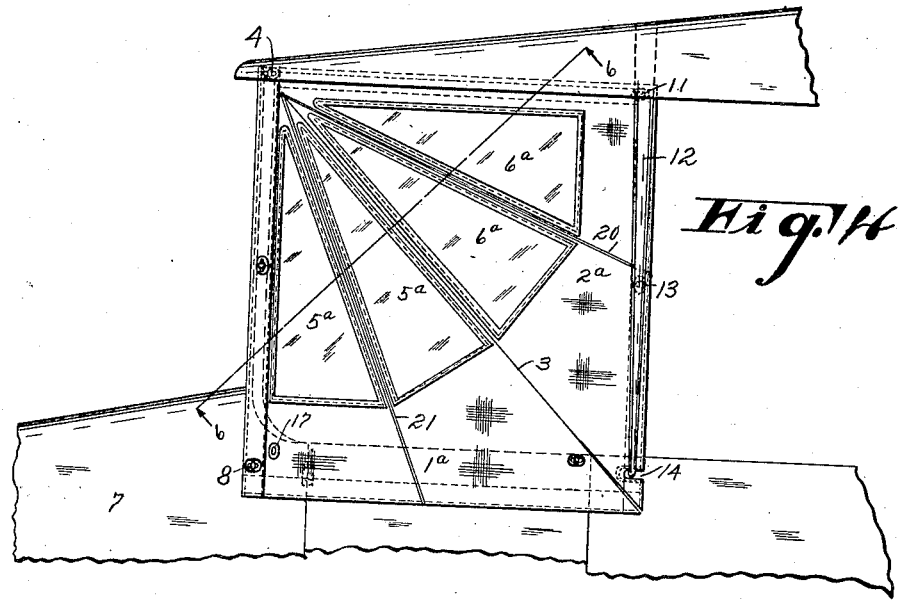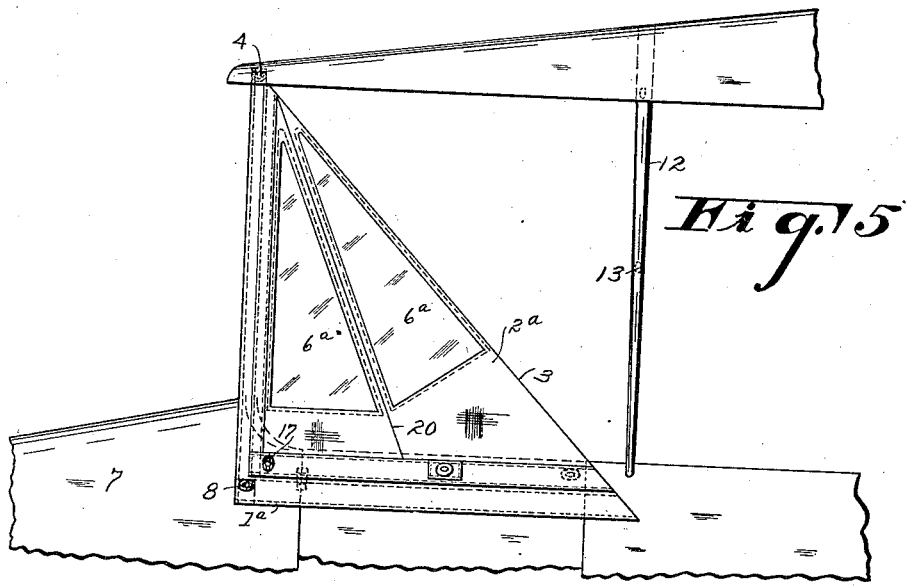

Patented Sept. 12, 1922.

1,428,708

UNITED STATES PATENT OFFICE.

MAXIMILIAN RAHR, JR., OF MANITOWOC, WISCONSIN.

VEHICLE QUARTER CURTAIN.

Application filed September 20, 1918. Serial No. 254,937.

*To all whom it may concern:*

Be it known that I, MAXIMILIAN RAHR, Jr., a citizen of the United States, residing at Manitowoc, county of Manitowoc, and State of Wisconsin, have invented new and useful Improvements in Vehicle Quarter Curtains, of which the following is a specification.

My invention relates to improvements in quarter curtains for the canopy tops of motor driven vehicles. In a former patent, dated December 11th, 1917, and numbered 1,249,828, I have shown and described a front quarter curtain formed in sections which diverge downwardly and rearwardly from the front upper corner where the curtain is attached to the top, or to the upper corner of the windshield.

The object of the present invention is to provide means whereby a curtain of the general type disclosed in my former patent may be partially folded by releasing a single fastening, (or two if desired), and in such a manner as to allow the occupants of a vehicle to have a free and unobstructed view, and to also allow free access of air while still retaining approximately one-half of the curtain in protecting position. I am thus enabled to provide means whereby the occupants of the vehicle may be adequately protected in any ordinary rain storm, unaccompanied by gales of wind transverse to the course of the vehicle, without entirely enclosing the occupants, or obstructing their view of the street at the sides of the vehicle. By my improvement, I am enabled to also accomplish this result in such a manner that the curtain may be instantly adjusted from a position affording complete protection to a partially open position, in such a manner that the occupants may shift the curtain from one position of adjustment to the other any desired number of times during a storm. It is well known that in the course of a storm gusts of wind frequently occur during periods when full protection or enclosure of the occupants of the vehicle is required, followed by intermediate periods of quiet, during which time it is desirable to have the curtains on one or both sides partially open to facilitate guiding the vehicle, and to enable the driver to avoid accidents.

A further object of my invention is to provide a form of construction whereby the front quarter curtain on each side of the vehicle may be allowed to swing with the door upon releasing one or two buttons or snaps, which serve to retain the curtain in full protecting position. In other words, my object is to provide means for not only quickly and easily adjusting the curtain from a fully protecting to a partially protecting position, but to also provide means whereby, when the curtain is in the partially protecting position, the door may be opened or closed and the occupants of the vehicle may enter or leave the vehicle without disturbing the curtain, and without interference by the curtain with such movements, the curtain being held by the door, when the latter is open, in a non-obstructing position.

My invention is peculiarly adapted for use as a front quarter curtain, although it may also be used for the intermediate quarters, to enable the latter to swing with the rear doors.

In the drawings:—

Figure 1 is a view of my improved curtain, in position for use when full protection is required, the entire space between the front seat bow and the windshield being closed.

Figure 2 is a similar view, showing the curtain partially folded, substantially one half of the curtain being still available to protect the occupants during a storm.

Figure 3 is a sectional view, drawn on line 3—3 of Figure 1.

Figures 4 and 5 are views similar to Figures 1 and 2 respectively, but showing a modified form of construction.

Figure 6 is an enlarged cross sectional view, on line 6—6 of Figure 4.

Like parts are identified by the same reference characters throughout the several views.

When my invention is embodied in a front quarter curtain of the design illustrated in Figures 1 and 2, the upper corner will be secured to the forward bow of the top, (or to the frame of the windshield, if desired), by means of any suitable fastening, preferably the snap fastening 4 indicated in the drawings, whereby the curtain may be detachably connected. The curtain is formed in two triangular sections, connected with each other either integrally or otherwise along a diagonal folding line 3. I preferably form the curtain sections integrally, and crease them along the line 3 to form a suitable hinge joint. On each side of this line, the respective sections may be provided with transparencies 5 and 6, preferably triangular in form to conform to the general shape of the curtain sections, although it is not material to my invention whether transparencies are used, or whether, if used, any particular form be adopted. The crease line, or joint between the sections 2 and 1, constitutes a hinge, whereby the upper section 2 may be swung downwardly upon the lower section 1. This hinge or crease line extends diagonally from a point at or near the front upper corner of the curtain downwardly to a point at or near the rear lower corner, and across the upper margin of the vehicle body, substantially at the upper rear corner of the door.

The door is hinged along its front margin, and the lower section 1 of the curtain is secured to the door near its rear upper corner at 6ª. The lower corner at the front margin of the curtain is secured to the cowl 7 at 8, in the vicinity of the upper door hinge, and it is not essential to my invention whether this fastening 8 be connected with the cowl or with the door, the material point being that the connection be made in the vicinity of the door hinge.

If desired, intermediate fastenings along the margin of the windshield, and along the top of the door, may be provided, whereby the lower section 1 may be securely held in position when in use.

The upper section 2 has its rear upper corner connected by a fastening 11 with the seat bow 12, or with the canopy, in the vicinity of the seat bow, and an intermediate fastening 13 may also be employed to connect this section of the curtain with said bow. Near the lower end of the rear margin of this section, the curtain is notched at 14 in order to permit its margin above the notch to be adjusted to the inner face of the bow, whereas the portion below the notch may be lapped over the outer surface of the vehicle body. Below the point where the crease or hinge line 3 of the curtain sections crosses the upper margin of the vehicle body, the two sections are preferably separate in order to allow the upper section to fold either inwardly or outwardly, as may be desired.

At all points of connection between the curtain and the parts of the vehicle with which it is associated so-called snap fastenings are preferably employed, whereby the entire curtain may be readily removed and stored whenever it is desired to do so.

The curtain above described differs materially from that disclosed in my former patent in the fact that the hinge 3, or crease line, extends across the central portion of the curtain from the upper front curtain to the lower rear curtain, i. e., from a point above the door hinges and near the axis of the hinges, projected, to a point adjacent to the swinging upper corner of the door. This enables me to release the upper section 2 of the curtain, and fold it either inwardly or outwardly upon the lower section, without releasing the lower section at a point where the latter is connected with the associated parts of the vehicle. Therefore, when the upper section has been folded, as above described, the door may be swung to open position, carrying both curtain sections with it, and thereby leaving an open space for persons to enter or leave the vehicle.

So far as I am aware, these quarter curtains have heretofore been so constructed that it was necessary to either remove them entirely from the vehicle in order to allow the occupants to enter or leave, or else require the occupants to crawl under them, the curtains occupying a wholly or partially obstructing position. As heretofore constructed, this would be the case even if the curtains were partially disconnected from their supports, except that in my former patent, above referred to, it was possible, by disconnecting the curtain at all points, except along its front margin, to allow it to hang at the end of the windshield in a position where it would interfere but slightly with the movements of persons entering or leaving the vehicle.

It is a great advantage, however, to be able to utilize the door to hold the curtain sections in an extended position when the door is open, and thus not only hold them in a position of non-interference, with freedom of movement of persons entering or leaving the vehicle, but also to prevent the curtains from becoming torn or wrinkled, or otherwise damaged. The curtains are also much neater in appearance when so held by the door in an extended position, with one section folded upon the other.

It will be obvious that my improved curtain is of such a character as to allow the occupants of a vehicle to instantly release the upper section at the point 11, and also at the point 13, if a fastening is used at that point, and when released, the upper section 2 will tend to drop by gravity to a folded position upon section 1, thereby allowing to the occupants a free and unobstructed view toward the side of the roadway. This is of great importance in cases where the transparencies have become fogged in the progress of a storm, and where circumstances require an unobstructed lateral vision.

Similarly, it is obvious that when a vehicle is being operated with the lower section of my improved curtain in protecting position and the upper section folded, said upper section may be instantly extended whenever occasion requires, and may be secured at the point 11 in the extended position without requiring the driver of the vehicle to remove more than one hand from the steering wheel. The importance of this feature is also obvious, since the driver of an automobile may keep the upper section of the curtain down at all times, except for short periods when gusts of wind require full protection.

In Figures 4, 5 and 6, the structure of the curtain is substantially the same as in Figures 1, 2 and 3, and the same reference letters are applied thoughout insofar as they are applicable to Figures 1, 2 and 3, but in Figures 4, 5 and 6, the upper section is additionally subdivided by a crease line 20, diverging from an apex point where it intersects with the central crease line 3 near the front upper corner fastening 4. A similar crease line 21, in the lower section, extends from the same apex point downwardly to a point near the center of the upper margin of the door. Both the lower section 1ª and the upper section 2ª are therefore additionally divided into two subsections. The transparencies 5ª and 6ª are correspondingly subdivided where transparencies are employed. It will be understood, however, that there is less need for transparencies in my improved curtain than in any ordinary curtain, for the reason that the upper section may be kept open during a considerable portion of the time. It is to be noted that the curtain is divided at the lower portion of the crease line 3 from about the point where such line crosses the upper edge of the door to the lower corner of the curtain in a manner similar to that previously described in connection with Figs. 1 and 2.

The principal advantage to be derived from sub-dividing the upper section of my curtain, as disclosed in Figures 4 and 5, is that I am thus enabled to utilize the crease line 20 as a folding point, and to release the upper quarter of the curtain for the purpose of folding it upon the next quarter or lower sub-section of the section 2ª, the snap fastening at 13 serving to maintain the lower half of the section 2ª, in position for use, notwithstanding the release of the fastening at 12. The principal object of sub-dividing lower section 1ª is to secure symmetry, and to enable me to so fold the entire curtain as to allow it to be stored in a smaller pocket when not in use.

While I have illustrated and described my improved quarter curtain as applied above the front door of a vehicle, it will be understood that it is also applicable to a curtain located in the space above a rear door. It will also be understood that while I have illustrated my improved curtain with the crease lines, or hinges, diverging or extending downwardly and rearwardly from the front upper corner, this is due to the fact that in the construction illustrated the door hinges are at the front margins of the doors. A location of the door hinges at the rear margins would, of course, require the folding lines to extend from the rear upper corner of the curtain section.

I claim:

The combination with a vehicle body, door, and canopy, of a set of triangular side curtain members, in hinge connection with each other along upwardly converging lines, and adapted to fold one upon another, button fastening means for detachably supporting the lower member with its lower margin extending below the top of and connected with the door, and with an upwardly extending margin in the vicinity of the axial line of the door hinges, and detachable means for supporting a second member as an extension of the first member,—the hinge connection between said members being located along an oblique line extending upwardly from the swinging corner of the door, the hinge connection between said members terminating substantially in a line with the upper edge of the door, the members being unconnected below the top of the door, whereby one or all of the members of said set of triangular side curtain members may be folded either inwardly or outwardly while the retained portion of the curtain remains taut.

In testimony whereof I affix my signature in the presence of two witnesses.

MAXIMILIAN RAHR, JR.

Witnesses:
O. C. WEBER,
A. J. McKERIHAN.